United States Patent
Sridhar et al.

(10) Patent No.: US 11,620,194 B1
(45) Date of Patent: Apr. 4, 2023

(54) MANAGING FAILOVER BETWEEN DATA STREAMS

(71) Applicant: Amazon Technologies, Inc., Seattle, WA (US)

(72) Inventors: Sharad Sridhar, Seattle, WA (US);
Sandesh Sanjeev, Seattle, WA (US);
Ankit Kumar, Bellevue, WA (US);
Munjal Doshi, Sammamish, WA (US);
Rachit Jain, Bothell, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/362,463

(22) Filed: Jun. 29, 2021

(51) Int. Cl.
*G06F 11/07* (2006.01)
*G06F 11/20* (2006.01)
*G06F 9/54* (2006.01)

(52) U.S. Cl.
CPC .......... *G06F 11/2028* (2013.01); *G06F 9/542* (2013.01); *G06F 2201/85* (2013.01)

(58) Field of Classification Search
CPC .................. G06F 11/2028; G06F 9/542; G06F 2201/85
See application file for complete search history.

(56) References Cited

U.S. PATENT DOCUMENTS 9,122,651 B1 * 9/2015 Baulier ............... H04L 41/0663
10,860,439 B2 * 12/2020 McAlister ........... G06F 11/1469

\* cited by examiner

*Primary Examiner* — Matthew M Kim
*Assistant Examiner* — Kyle Emanuele
(74) *Attorney, Agent, or Firm* — Knobbe, Martens, Olson & Bear, LLP

(57) ABSTRACT

Features are disclosed for managing multiple hosts that stream sequential data to nodes for propagation. The hosts can include a primary host and a failover host that each store a replica of the sequential data. A computing device can monitor the hosts and identify the occurrence of a failover event for the primary host. For example, the computing device may determine the schema has been modified. The computing device can further determine to failover to the failover host based on the failover event. The computing device can insert a flip task into the stream of sequential data for the primary host. The insertion of the flip task may be automatic. Further, each node reading from the stream of sequential data for the primary host may encounter the flip task and failover to the failover host at the same logical position but a different absolute position.

20 Claims, 6 Drawing Sheets

| 202 Primary Event Stream | |
|---|---|
| Position 99 | Event 99 — 201 |
| Position 100 | Event 0 — 203 |
| Position 101 | Event 1 — 204 |
| Position 102 | Event 2 — 206 |
| Position 103 | Flip Task — 208 |
| Position 104 | Event 3 — 210 |
| Position 105 | Event 4 — 212 |

| 214 Failover Event Stream | |
|---|---|
| Position 251 | Event 99 — 213 |
| Position 252 | Event 0 — 215 |
| Position 253 | Event 1 — 216 |
| Position 254 | Event 2 — 218 |
| Position 255 | Flip Task — 208 |
| Position 256 | Event 3 — 222 |
| Position 257 | Event 4 — 224 |

MANAGING FAILOVER BETWEEN DATA STREAMS

BACKGROUND

Organizations may use data replicas to store replicas of an event stream from a database for reading by nodes, including propagators that propagate event stream data to other systems. Nodes can read updates directly from a task table of the data replicas. Each node can utilize the task table to read updates directly from a single, primary replica. Failover between the replicas can occur by resetting (e.g., manually) the connection to the replica. Further, the node can resume reading from a last processed task on the task table. Failover between the replicas involves performing a series of manual steps to resume reading from a new replica. Each replica of the event stream may be a separate entity with its own numbering scheme and identifiers associated with the task table of the respective replica. Further, each node may use the numbering scheme and the identifiers to identify how to read the updates from the respective replica. Each node can read the updates and propagate the updates to a separate system.

BRIEF DESCRIPTION OF THE DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

FIG. 2 depicts a schematic diagram of a primary replica of the event stream and a failover replica of the event stream in accordance with aspects of the present disclosure.

DETAILED DESCRIPTION

Figure 1:
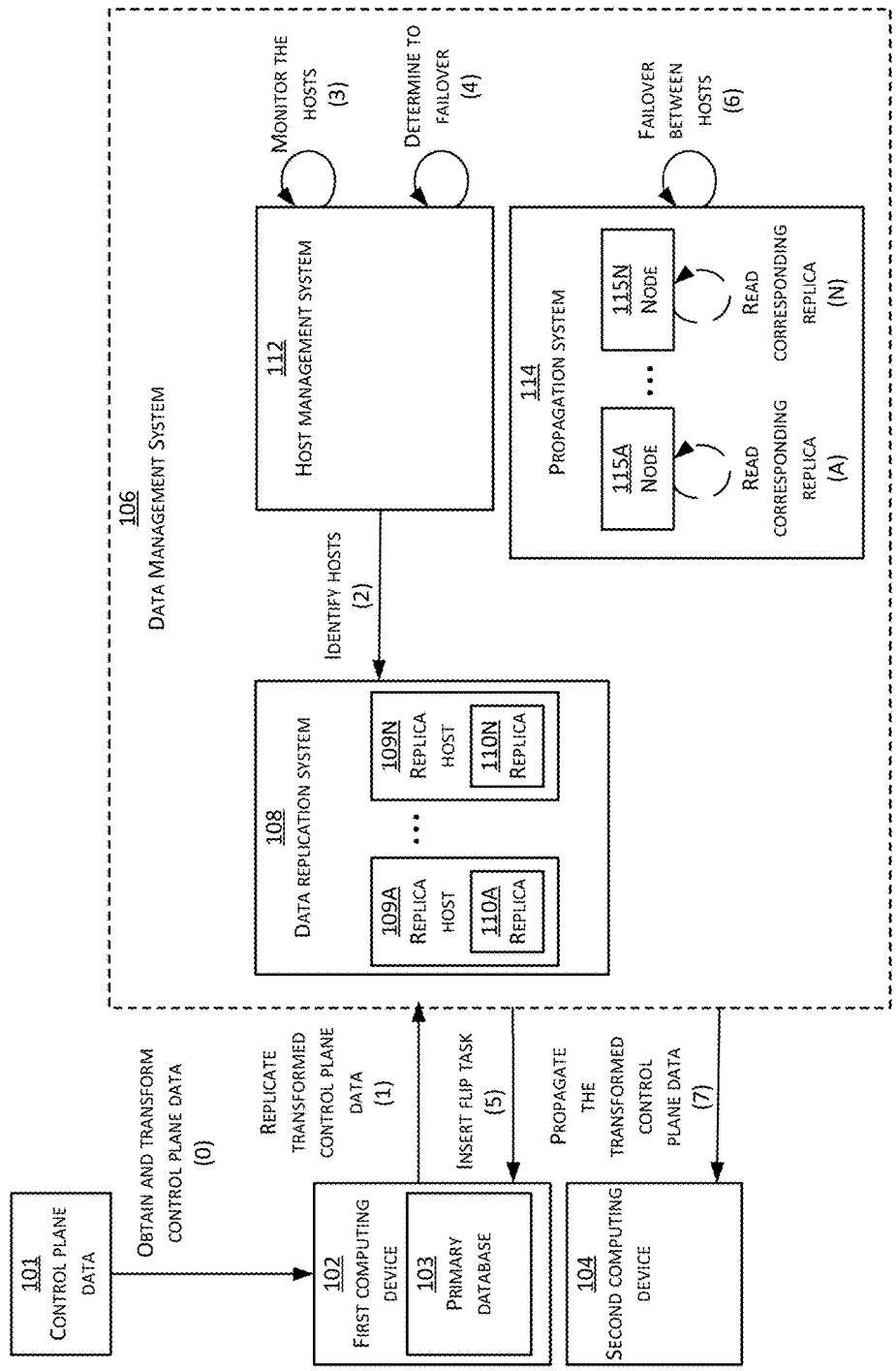
FIG. 1 depicts a schematic diagram of an example networked environment according to some embodiments.

The present disclosure generally relates to provisioning and managing a data management platform including data replicas (e.g., regional databases, data stores, data sets, etc.) of a primary database (e.g., an event stream stored in the primary database) for access by nodes (e.g., propagators, computing devices, etc.). For example, hosts may read or otherwise obtain data from a computing device via a control plane (e.g., an identity access management ("IAM") control plane) identifying resources created and modified by users and replicate the data to the replicas. Further, the nodes may be part of a propagation system that reads, transforms, and propagates data (e.g., IAM events such as mutations) from the replicas to a compute service for further efficient access (e.g., low latency operations). The replicas may each be hosted by one or more hosts (e.g., replica hosts). The hosts may publish or store replicas of the primary database (e.g., replicas of the event stream). For example, each host may publish (e.g., make available) a replica of the primary database (e.g., a replica of a stream of sequential data). The nodes of the propagation system may consume the data from the replicated stream of data of the replica hosts and provide the consumed data to an additional computing system. Further, each node (or some subset thereof) may consume the data from the same replica and the same host. Each node or subset of nodes consuming data from the same replica may further enable the nodes to maintain the same data. Further, the parallel nature of the nodes ensures consistency across the system as each node may read an event in parallel from a particular replica.

A first replica may be designated as a primary replica and each node may read events from the first replica in parallel. During operation of the replicas, a particular replica or host may encounter a failover event. For example, a schema change, a security patch, or other maintenance activity may occur with respect to the particular replica or the host storing the replica. As a result of the failover event, the replica and/or the host may be unavailable for a period of time. In the event that such a failover event occurs that causes a replica and/or the host to be unavailable for a period of time, the additional replicas provide redundancy or failover, allowing the nodes to continue processing events based on the replicas of the event stream. In order to enable the nodes to continue reading events while the replica is unavailable, the nodes reading from the replica may failover to a failover replica. A host management system may monitor the replicas and may implement the failover process. In order to ensure that the nodes efficiently failover to the failover replica, the host management system can insert a particular task or event (e.g., a flip task) into the primary database (e.g., the event stream of the primary database). Each host may read the particular task and store the task in a respective replica of the primary database. The presence of the flip task in the replicas of the primary database indicates that the failover is to occur at that particular point in the event stream, thus ensuring that all nodes failover at the same relative position with the event stream. The nodes may read the flip task from a primary replica of the primary database and determine to switch to the failover replica. For example, the nodes may stop the current connection to the primary replica and may execute steps to update local metadata to read from a different point in the failover replica. This enables the node to failover from the primary replica to a corresponding position in the failover replica.

Each host may store the events as a replica of an event stream that includes the same relative positions but different absolute positions (e.g., distinct positions, fixed positions, specific positions). The replica of the event stream for each host may be stored in a log (e.g., a binary log) of events. The binary log (or the "bin log") may store events describing data changes (e.g., changes to a database by a first computing device) and may provide a record of the data changes. The computing device providing the data from the primary database (e.g., an event stream of the primary database) for storage and replication to the hosts may provide event information to each host for replication in a corresponding binary log of the hosts. The absolute position of an event may be different for each binary log and therefore for each host (e.g., the physical position of the event within each log, the log-specific sequence identifiers of the event in different logs, etc.), but the relative position of an event based on the sequential nature of the events may be the same for each binary log and therefore for each host. For example, an event stream of the primary database may include a sequential ordering (e.g., grouping) of Event 1, Event 2, and Event 3 and a first binary log (e.g., a first replica of the event stream) of a first replica host may include Event 1, Event 2, and Event 3 based on the sequential ordering with Event 1 in a first absolute position (e.g., bin position, bin location, bin identifier, etc.) of the first binary log, Event 2 in a second absolute position of the first binary log, and Event 3 in a third absolute position of the first binary log. A second binary log (e.g., a second replica of the event stream) of a second replica host may include Event 1, Event 2, and Event 3 based on the same relative sequential ordering (e.g., Event 1 located immediately before Event 2, which located immediately before Event 3, etc.), but with Event 1, Event 2, and Event 3 in different absolute positions as compared to the first binary log of the first replica host. The insertion of the flip task into the primary database can enable the node reading the flip task from a primary replica host's binary log to failover to the same relative position but a different absolute position in the failover replica host's binary log. For example, the flip task may identify to failover after reading Event 3 which may correspond to a particular absolute position of the first binary log and a different absolute position of the second binary log. Further, the host management system can automate the failover process by automatically inserting the flip task into the primary database based on identifying the occurrence of a failover event for the primary replica.

The replicas may include a data store, a data repository, a data set, a data lake, a data warehouse, etc. for the storage and management of data. For example, the replicas may store particular data as the data is read into the replicas from a primary database of a computing device via the control plane. Each of the replicas may be a replica of a set of sequential data stored in the primary database. For example, each of the replicas may be a replica of the set of sequential data obtained from a computing device. As each replica is a replica of the same set of sequential data, the replicas can enable efficient failover in the event of a failover event at a replica. In some embodiments, data may be directly read into the replicas from a data source. The replicas may act as virtualized storage drives, enabling the nodes and the hosts to perform certain operations corresponding to the data stored within the data replicas. For example, hosts (or a computing device providing the data) may write data to the replicas and a particular node may read from the replicas as if the replicas were physically coupled to the node. However, particularly in the context of cloud computing, the replicas may not be physically coupled to the node. Instead, the replicas may be connected to the node via a network. Moreover, rather than being a physical drive, the replicas may be a logical volume implemented on one or more underlying physical drives, which drives may vary among replicas or even the same replica. Further, the replicas may be implemented according to a certain set of data characteristics. For example, the replicas may have a particular type or a particular size.

Each replica may be hosted by a host (e.g., a computing host). For example, a particular replica may be hosted by a corresponding computing device or computing system. The host may store the associated replica. Further, the host may write to the associated replica. Each host may provide a secure environment and/or interface for propagator nodes to access the replicas. For example, the nodes may communicate with a respective host (e.g., a primary host) to request access to the replicas and the hosts may facilitate access to the replicas. In some embodiments, one host (e.g., the primary host) may be active for a particular time period and other hosts may be inactive. The inactive hosts may be failover hosts and may read data from the computing device, but the nodes may not read the data from the inactive hosts. Each host may be associated with a particular region (e.g., a particular opt-in region). For example, a host may be associated with a particular geographic location or region. It will be understood that the hosts may be associated with the same or different geographic locations or regions. Further, the replica and the host may be dedicated to one or more regions (e.g., opt-in regions) and/or one or more nodes (e.g., opt-in nodes). Opt-in regions may include security boundaries between the replica and the nodes and/or other computing devices. Further, particular data may not be shared between opt-in regions based on the security boundaries of the opt-in regions. Therefore, each opt-in region enables users to isolate the opt-in region from other regions and absolute positions of events may not be shared between opt-in regions.

A node (e.g., a propagator) may obtain data from a primary replica of the replicas. The node may obtain the data and process the data. For example, the node can obtain the data and transform the data based on one or more transformation rules. The node may be a propagation service or system or any other computing system. For example, the node may be assigned to read data from one or more databases and provide the data (or a transformed version of the data) to another computing system. In some embodiments, the node may read the data from the primary replica via batch or chunk data processing. In other embodiments, the node may read the data from the primary replica via streaming data processing. Further, the node may store a database identifier identifying the primary replica. In some embodiments, the node may be in communication with a system (e.g., the host management system) to identify the primary replica and/or the primary host. Therefore, the node can obtain the data from the primary replica.

A host management system may monitor the hosts and the replicas. The host management system may include a computing device or a computing system. For example, the host management system may be a computing system in communication with the hosts. Further, the host management system may be in communication with the nodes. The host management system may request and/or obtain data identifying a status of replicas and/or hosts associated with the host management system. Based on the data, the host management system may identify whether a failover event has occurred for a particular replica and/or host. For example, the host management system may identify whether a failover event occurred for a primary replica and/or a primary host. The host management system may determine that the failover event has occurred and may initiate the failover process has occurred. In order to initiate the failover process, the host management system may identify a failover host and/or a failover replica. The host management system may identify the failover host and/or the failover replica based on a previous designation (e.g., a designation by a user). Further, the host management system may dynamically identify the failover host and/or the failover replica based on the availability of one or more hosts. Based upon identifying the failover host and/or the failover replica, the host management system can initialize the failover process by placing a flip task identifying the failover host and/or the failover replica into the event stream of the primary database. Each host may read the flip task from the event stream of the primary database and store the flip task in a respective replica of the primary database. The flip task may be inserted at the same relative position but different absolute positions of each replica.

In conventional systems, in order to enable failover between replicas, the nodes may read from a task-table. In these implementations, failing over to a new replica may include changing the connection from the previous replica to the new replica, and resuming reading from the last processed task on the task table at the new replica. For example, the tasks may be stored on a task table that the nodes can read directly from and, in response to a failover event, the nodes may continue reading from the same location in the task table on the new replica host. However, in implementations in which the replica nodes are not configured to read from a task table, it may be difficult for nodes to identify or determine a last processed task or event upon a failover. Further, the nodes may use the event stream (e.g., a binary event stream) to obtain tasks or events. Each replica may store data in a replica of the event stream (using binary logs) and the data may be stored at different absolute positions within each replica. This can be disadvantageous during failover as a node may not be able to directly transition from a location in a first replica to the same location in a second replica as the same absolute location may include different events for each replica. Therefore, in conventional systems, a user may need to perform a series of manual steps for the nodes to resume reading from the replicas in the event of a failover. The series of manual steps may result in a significant outage for the nodes and/or the data management system. This can be disadvantageous where the data read from the computing device is time-sensitive. Further, the manual nature of the failover process may make it difficult for users to initiate the failover in a consistent and secure way. In conventional systems, the manual nature of the failover process can result in a time-consuming and error-prone process to failover between replicas in the event of a failover. Further, multiple nodes may be reading from the same replica (e.g., a replica may be designated the primary replica for a first node and a second node). While separate failover processes may be initiated for each node, each node may not failover at the same point within the event stream of the primary database. Further, such a failover at different locations within the event stream can cause inconsistency in the reading events from the replicas of the event stream such that there may be inconsistency between hosts when indexing the same event. In order to manage the failover between replicas, a user can individually and manually failover each node simultaneously to the failover replica. However, such a manual and individual process can be arduous and may not be capable of being performed in a scalable and efficient manner. For example, such a process may not be possible, where ten or more nodes are reading events from the same replica. Further, such a manual process may not account for the potential of user error that may occur during the manual process.

As mentioned above, hosts may read data from a primary database of a computing device and write the data to replicas. Each replica may store a replica of the data. For example, the data may be sequential data and each replica may store replica of the sequential data. The hosts may read the data over a period of time and update the replicas and nodes may read the data from the replicas. As the nodes are reading data from the replicas, a failover event may occur at a host and/or a replica. Typically, users (e.g., a data manager, an operator, etc.) may be responsible for manually failing over the nodes from a primary replica corresponding to the failover event to a failover replica. Further, the user may be responsible for ensuring that each node fails over at the same logical point or location. For example, the user may be responsible for ensuring that each node fails over from a first location in the primary replica to a second position in the failover replica. This may provide an inefficient or otherwise unsatisfactory experience for users based on the multiple nodes that may be reading data from a particular replica. For example, users may find it difficult and inefficient to manually failover the multiple nodes from the primary replica to the failover replica. Further, the user may not consistently failover each node. This may lead to a disjointed and inconsistent experience as the nodes may be reading different data from the failover replica and/or may be reading data from different locations within the failover replica. Further, the disjointed nature of the failover process may result in significant delays as data consumers may be required to attempt the failover process multiple times. Such a delay in implementing the failover process may cause significant delays in reading data from the computing device and propagating the data that is required to enable quick insights and decision making. A user or system receiving the propagated data may require access to the data in a timely manner and delays in accessing the data may be disadvantageous.

Some aspects of this disclosure address the problems noted above, among others, by establishing a platform that is provisioned to implement an efficient failover process. The platform may be implemented on and/or by a computing device to manage data obtained from a computing device. The platform may be a platform shared between multiple users (e.g., the platform may obtain data from multiple computing devices) to initiate an efficient failover process. The platform may monitor the hosts and/or the replicas storing data obtained from the computing device to identify the occurrence of a failover event, such as based on a change to a domain name system ("DNS") mapping (e.g., a CNAME record) for the primary host. Upon identifying the occurrence of a failover event, the platform can insert a particular task and/or event in the primary database of the computing device. For example, the task and/or event may include a flip task. The task and/or event may identify that nodes should failover to a particular failover replica. The platform can determine events stored in the primary replica of the event stream. For example, the platform can determine events of the primary replica of the event stream that have not been read by the nodes. Further, the platform can insert the task and/or event into the primary database based on the determined events of the primary replica of the event stream. For example, the platform may determine that events 101, 102, 103, and 104 have been replicated by a replica host and have not been read by the nodes. Further, the platform may insert the task and/or event between event 101 and event 102. The platform can store data identifying the placement of the task and/or event. The platform can reduce the time required to implement a failover process (e.g., from 2.5 hours to 3 minutes).

Additional aspects of this disclosure relate to a node that can read data from the primary replica of the event stream. The node may read the data and the particular task and/or event (e.g., the flip task) from the primary replica of the event stream. Based upon reading the particular task and/or event from the primary replica of the event stream, the node may determine to failover to the failover replica of the event stream. The particular task and/or event may identify the failover replica of the event stream. In some embodiments, the node may store a designation of the failover replica of the event stream. The particular task and/or event may identify a relative position within the primary replica of the event stream and based on the relative position, the node can failover to the same relative position within the failover replica of the event stream. For example, the particular task and/or event may identify a relative position between event 101 and event 102 and the node may identify this relative position based on reading the particular task and/or event and failover to the same relative position within the failover replica of the event stream. Further, each replica may store the flip task in the same relative position and, based on the failover replica storing the flip task in the same relative position, each node can failover to the same relative position, but a different absolute position of the failover replica. Therefore, each node may failover (e.g., switch) at the same logical position or point within the replicas of the event stream.

Additional aspects of this disclosure relate to the automation of the failover process. For example, the platform can automate the insertion of the particular task and/or event into the event stream. The platform may periodically or aperiodically monitor the hosts and/or the replicas for detection of a failover event. Upon detection of the failover event, the platform can automatically insert the particular task and/or event into the event stream. In some embodiments, the automatic insertion of the task particular and/or event may be performed by a separate, parallel process or system.

Various aspects of the disclosure will now be described with regard to certain examples and embodiments, which are intended to illustrate but not limit the disclosure. Although aspects of the embodiments described in the disclosure will focus, for the purpose of illustration, on a single node, a single host, and/or a single replica, one skilled in the art will appreciate that the techniques disclosed herein may be applied to any number of nodes, hosts, replicas, etc. being implemented on the network infrastructure.

FIG. 1 illustrates an example environment 100 in which a first computing device 102 and a second computing device 104 may be implemented according to some embodiments. The example environment may include a data management system 106 that exists within a particular network. The example environment may include more, less, or different components.

The environment 100 can be or include a cloud provider network (sometimes referred to simply as a "cloud"), which refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

The components of the example environment 100 may communicate over a network. The network illustratively represents a distinct network environment. In one embodiment, the network is a virtualized network logically implemented by a physical network referred to as the substrate, which includes physical network hardware such as routers, switches, network address translators ("NATs"), and so on, as well as the physical connections among the devices. For example, the network may represent a virtual private network environment ("VPE"). Generally described, a VPE can represent a virtualized computing network (hosted by a host device or multiple host devices on a physical network) that enables devices connected to (or "inside") the VPE to communicate as if connected to one another via a physical local area network ("LAN"). A VPE may in some instances be referred to as a virtual private cloud ("VPC"). A VPC is a custom-defined, virtual network within a cloud provider network. A VPC can provide the foundational network layer for a cloud service, for example a compute cloud or an edge cloud, or for a customer application or workload that runs on the cloud. A VPC can be defined by at least its address space, internal structure (e.g., the computing resources that comprise the VPC), and transit paths. A provider of the substrate network may enable users to configure and manage VPEs on the substrate network. In one specific, non-limiting embodiment, a network computing provider may comprise a plurality of physical network computing devices. The network computing provider may be configured to host a plurality of virtual network computing providers (VPEs/VPCs), each of the plurality of virtual network computing providers logically separated from each other virtual network computing provider of the plurality of virtual network computing providers.

The network environment 100 can logically include a first computing device 102, a second computing device 104, which represent computing systems or devices operating within—or in communication with—the cloud provider network or other network in which resources are provisioned for computing services. The first computing device 102 may be a customer computing device or a user computing device. Further, the first computing device 102 may create and modify sequential data (e.g., control plane data 101 received via a control plane). The first computing device 102 may transform the control plane data 101 for replication and propagation to the second computing device 104. The first computing device 102 and/or the second computing device 104 may be physical devices, or logical devices implemented on underlying physical computing devices. For example, the first computing device and/or the second computing device 104 may represent virtualized devices provided by a hosted computing environment, which may also be referred to as a "cloud computing environment." Such an environment can include a number of dynamically provisioned and released computing resources.

The first computing device 102 may be used by or otherwise correspond to a user, a customer, etc. In some embodiments, the first computing device 102 may further correspond to a user or a group of users that generate data for propagation to the second computing device 104. The first computing device 102 may interact with the data management system 106 to provide transformed data for replication (e.g., via the control plane). The data may correspond to one or more resources (e.g., events) created and/or modified by the first computing device.

The second computing device 104 may be used by or otherwise correspond to the same user or customer as the first computing device 102. In some embodiments, the first computing device 102 and the second computing device 104 may be used by or otherwise correspond to different users or customers. In some embodiments, the second computing device 104 may further correspond to a user or a group of users that receive data propagated and/or transformed by the data management system 106 from the first computing device 102.

The data management system 106 can be a computing device or system implementing a data management platform or process for data received from the first computing device 102 (e.g., via the control plane). The data management system 106 may offer a platform for storing the data from the first computing device 102 in replicas. The data management system 106 may further offer a platform for monitoring the replicas and/or the replica data streams associated with the replicas. Each replica may include a replica data stream (e.g., replica event stream) of a data stream of a primary database 103. The data management system 106 may receive data associated with each replica and/or replica data stream. The data may identify a status associated with a particular replica and/or replica data stream. For example, the data may identify security patches or other maintenance events being implemented for a particular replica and/or replica data stream. Based on the data, the data management system 106 can identify a failover event occurring at a particular replica and/or replica data stream. The data management system 106 can identify failover events as data is read into the replicas. Further, the data management system 106 can determine that a particular replica should be taken down for a maintenance event and the data management system 106 can cause nodes reading from the replica to failover prior to taking the replica down for the maintenance event. For example, the data management system 106 can identify a maintenance event for the replica, cause failover into a failover replica, and cause performance of the maintenance event for the replica (e.g., by taking the replica down for performance of the maintenance event). In order to cause the failover to occur, the data management system 106 may insert a flip task into the event stream of the primary database 103. The flip task may cause a node reading from a replica of the event stream to failover into a failover replica of the event stream. The flip task may cause the node to failover from a first position in the primary replica of the event stream to a second position in the failover replica of the event stream. Further, the first position and the second position may be different absolute positions but the same relative position. For example, the first position and the second position may include a same relative position based on the sequential nature of the data (e.g., between Event 1 and Event 2) but different absolute positions (e.g., physical locations within bin logs, bin identifiers, etc.) in corresponding binary logs.

The data management system 106 may include a data replication system 108 to replicate transformed data received from the first computing device 102 (e.g., via the control plane). The data replication system 108 may receive the data and replicate the data between one or more replica hosts 109A, . . . , 109N (e.g., computing devices hosting the data). Further, the data replication system 108 may store one or more replicas 110A, . . . , 110N (e.g., replicas of the data received from the first computing device) on the one or more replica hosts 109A, . . . , 109N. For example, the data replication system 108 may include one or more replica hosts 109A, . . . , 109N for storing one or more replicas 110A, . . . , 110N of a primary database (e.g., control plane data as transformed by the first computing device). In some embodiments, the one or more replica hosts 109A, . . . , 109N may be associated with the first computing device 102 and may be instantiated to store the data for further processing. It will be understood that the one or more replica hosts 109A, . . . , 109N can include any number of hosts. Further, the one or more replica hosts 109A, . . . , 109N can include any number of replicas. In some embodiments, each of the one or more replica hosts 109A, . . . , 109N may store (e.g., host) one replica of the data. Each of the one or more replica hosts 109A, . . . , 109N may store a corresponding replica of an event stream. For example, the event stream may include a stream of events (e.g., tasks) obtained from the first computing device 102. The event stream may be updated as events are obtained. In some embodiments, the first computing device 102 may identify a period of time to retain the events within the event stream. In other embodiments, the events may be removed from the event stream as the events are obtained (e.g., read) by the nodes.

The data management system 106 may further include a host management system 112 to manage the one or more replica hosts 109A, . . . , 109N. The host management system 112 may monitor the one or more replica hosts 109A, . . . , 109N to identify failover events. Further, based on identifying a failover event (e.g., failover event occurring at a primary host), the host management system 112 can insert a flip task into the event stream of the primary database 103. A node reading data from a replica of the event stream may read the flip task which can cause the node to transition to a failover replica of the event stream of a failover host. Further, the flip task may cause the node to transition from a relative position within the replica of the event stream of the host to the same relative position within the failover replica of the event stream of the failover host. Further, the flip task may cause the node to transition from an absolute position within the replica of the event stream of the host to a different absolute position within the failover replica of the event stream of the failover host. In some embodiments, the flip task may identify the failover host, the absolute position, and/or the relative position for failover.

The data management system 106 may further include a propagation system 114 to obtain event stream data of the one or more replicas 110A, . . . , 110N from the one or more replica hosts 109A, . . . , 109N. The propagation system 114 may include one or more nodes 115A, . . . , 115N to obtain the data from the one or more replica hosts 109A, . . . , 109N. Each of the one or more nodes 115A, . . . , 115N may obtain data from a primary host of the one or more replica hosts 109A, . . . , 109N. It will be understood that the one or more nodes 115A, . . . , 115N can include any number of nodes. Further, a first subset of the one or more nodes 115A, . . . , 115N can obtain data from a first primary host of the one or more replica hosts 109A, . . . , 109N and a second subset of the one or more nodes 115A, . . . , 115N can obtain data from a second primary host of the one or more replica hosts 109A, . . . , 109N. Further, the one or more nodes 115A, . . . , 115N can obtain the data, perform one or more data transformations on the obtained data, and propagate the data to the second computing device 104 (e.g., a downstream service or system). In some embodiments, the propagation system may be a middle layer that reads, transforms, and propagates events (e.g., IAM mutations) to the second computing device 104.

At [0], the first computing device 102 obtains and transforms control plane data 101. The first computing device 102 may obtain the control plane data 101 and transform (e.g., mutate, modify, etc.) the control plane data 101 to generate transformed control plane data for storage in a primary database 103 of the first computing device 102. In some embodiments, the source of the control plane data 101 may be a system local to the data management system 106. In other embodiments, the source of the control plane data 101 may be remote from the data management system 106. The control plane data 101 may correspond to data generated by or provided by a data source to the first computing device 102 for data transformation or mutation. The data source can provide the control plane data 101 via streaming processing or batch processing to the first computing device 102.

At [1], the first computing device 102 replicates the transformed control plane data as stored in the primary database 103 to the data management system 106. In some embodiments, the first computing device 102 may replicate any transformed sequential event data. Further, it will be understood that while reference is made to control plane data 101, any data may be replicated to and managed by the data management system 106. The first computing device 102 may transform the control plane data 101 and replicate the transformed control plane data to the data management system 106 to be read by a propagation system 114 and propagated to a downstream consumer (e.g., the second computing device 104). In providing the transformed control plane data to the data management system 106, the first computing device may provide the transformed control plane data to the data replication system 108 for replication across the one or more replica hosts 109A, . . . , 109N. Further, the data replication system 108 may replicate the transformed control plane data across the one or more replica hosts 109A, . . . , 109N and the transformed control plane data may be stored on the one or more replica hosts 109A, . . . , 109N as one or more replicas 110A, . . . , 110N. In some embodiments, the first computing device 102 may directly store the transformed control plane data in the one or more replicas 110A, . . . , 110N of the one or more replica hosts 109A, . . . , 109N. Each of the one or more nodes 115A, . . . , 115N may read the one or more replicas 110A, . . . , 110A. In the example of FIG. 1, at [A] and [N], the one or more nodes 115A, . . . , 115N each read data from a corresponding replica of the one or more replicas 110A, . . . , 110N. For example, at [A], the node 115A may read data from the replica 110A (e.g., based on a prior mapping of the node 115A to the replica 110A) and, at [N], the node 115N may read data from the replica 110N (e.g., based on a prior mapping of the node 115N to the replica 110N). In some embodiments, the first computing device 102 can replicate the transformed control plane data to a separate primary database and the data management system 114 may read the transformed control plane data from the separate primary database. Therefore, the first computing device 102 can replicate the transformed control plane data to the data management system 106.

At [2], the host management system 112 identifies one or more replica hosts 109A, . . . , 109N. The host management system 112 may identify one or more replica hosts 109A, . . . , 109N that store the transformed control plane data. In some embodiments, the host management system 112 may not identify the one or more replica hosts 109A, . . . , 109N. Further, the host management system 112 may identify the one or more replica hosts 109A, . . . , 109N based on one or more events. For example, the host management system 112 may identify the one or more replica hosts 109A, . . . , 109N based on determining the transformed control plane data has been provided to the data management system 106. The host management system 112 may further identify a primary host of the one or more replica hosts 109A, . . . , 109N (e.g., a host storing a primary replica of the transformed control plane data for at least one node) and one or more failover hosts of the one or more replica hosts 109A, . . . , 109N (e.g., one or more hosts storing a replica of the transformed control plane data and available for failover in the event of a failover event at the primary host). Therefore, the host management system 112 can identify the one or more replica hosts 109A, . . . , 109N.

At [3], the host management system 112 monitors the one or more replica hosts 109A, . . . , 109N. The host management system 112 can monitor the one or more replica hosts 109A, . . . , 109N, the one or more replicas 110A, . . . , 110N, and/or any other information associated with the transformed control plane data. The host management system 112 can monitor the one or more replica hosts 109A, . . . , 109N for a failover event (e.g., a maintenance event, a transition event, etc.). The failover event may include a security patch, a schema change, or any other event associated with the replication of the transformed control plane data. Therefore, the host management system 112 can monitor the one or more replica hosts 109A, . . . , 109N.

At [4], the host management system 112 determines to failover for a particular host. The host management system 112 can determine to failover based on identifying a failover event associated with a particular host of the one or more replica hosts 109A, . . . , 109N. By identifying the failover event, the host management system 112 can determine that nodes linked to the host associated with the failover event should be failed over to a failover host as the host may be unavailable for a period of time for performance of the failover event. Further, the host management system 112 can identify a failover host of the one or more replica hosts 109A, . . . , 109N. In some embodiments, the failover host may be pre-designated by a user (e.g., via the first computing device 102), the data replication system 108, or by any other system. In other embodiments, the host management system 112 may identify the failover host based on availability of the one or more replica hosts 109A, . . . , 109N. For example, the host management system 112 may designate a host of the one or more replica hosts 109A, . . . , 109N as the failover host based on determining that the host is storing a replica of the transformed control plane data (e.g., a replica of the primary database 103) and/or the host is available. Further, the host management system 112 may identify a relative position for failover (e.g., a position between one or more events of the event stream). In some embodiments, the relative position may be based on the one or more nodes 115A, . . . , 115N reading data from the replica of the event stream. Therefore, the host management system 112 can determine to failover for a particular host.

At [5], the host management system 112 inserts a flip task into the event stream of the primary database 103. For example, the event stream may include Event 1, Event 2, and Event 3. The sequential ordering of the event stream may be "Event 1, Event 2, and Event 3" and may be shared by the replicas of the event stream. The host management system 112 may insert the flip task into the relative position of the event stream. For example, the host management system 112 may identify the relative position as between Event 1 and Event 2, after Event 1, before Event 2, or any other relative position of the event stream. The host management system 112 can insert the flip task in the relative position of the event stream. Further, the event stream may be a binary log and the host management system 112 may insert the flip task into an absolute position of the binary log that may be particular to the binary log. The first computing device may provide control plane data including the flip task from the primary database 103 to the data replication system 108 for replication across the one or more replica hosts 109A, . . . , 109N. Further, the data replication system 108 may replicate the control plane data across the one or more replica hosts 109A, . . . , 109N and the control plane data may be stored on the one or more replica hosts 109A, . . . , 109N as the one or more replicas 110A, . . . , 110N. Further, the flip task may be stored at the same relative position in each of the one or more replicas 110A, . . . , 110N. Therefore, the host management system 112 can insert the flip task into the event stream of the primary database 103.

At [6], the propagation system 114 initiates a failover between the host (e.g., the primary host) and a failover host. Each of the one or more nodes 115A, ..., 115N may read data from a replica of the event stream of the primary database 103. Further, each of the one or more nodes 115A, ..., 115N may read the flip task inserted by the host management system 112. Based on reading the flip task, each of the one or more nodes 115A, ..., 115N may failover to the failover replica. Further, the flip task may ensure that each node switches at the same logical point from the replica to the failover replica thereby removing any possibility of inconsistencies between the nodes. The flip task may identify a relative position (e.g., a position between events) of the event stream and each of the one or more nodes 115A, ..., 115N may failover to the same relative position of the failover replica of the event stream of the failover host. Further, each of the one or more nodes 115A, ..., 115N may failover from a first absolute position (e.g., a first position within a first binary log) of the replica to a different absolute position (e.g., a second position within a second binary log) of the failover replica. Based on the failover, each of the one or more nodes 115A, ..., 115N can read the data from the failover replica of the event stream of the failover host. Therefore, the propagation system 114 can initiate a failover between the host and the failover host.

At [7], the data management system 106 propagates the transformed control plane data to the second computing device 104. Each of the one or more nodes 115A, ..., 115N may read the data from the evet stream of the failover host and store the data. Further, the one or more nodes 115A, ..., 115N may perform one or more data transformations on the data. The one or more nodes 115A, ..., 115N can provide (e.g., propagate) the transformed data to the second computing device 104. Therefore, the data management system 106 can propagate the transformed control plane data to the second computing device 104.

FIG. 2 depicts an example schematic diagram depicting a set of example replicas of an event stream 200 in accordance with aspects of the present disclosure. Illustratively, the set of example replicas of the event stream 200 may each store replicas of data received from the same computing device. For example, the set of example replicas of the event stream 200 may each store a corresponding replica of a set of sequential data. The information included within the set of example replicas of the event stream 200 may correspond to one or more events from the sequential data. For example, the sequential data may include a plurality of events that are stored in the set of example replicas of the event stream 200. Therefore, the set of example replicas of the event stream 200 can correspond to replicas of a stream of events of the sequential data.

The set of example replicas of the event stream 200 can include a primary replica of the event stream 202 and a failover replica of the event stream 214. It will be understood that the set of example replicas of the event stream may include more, less, or different replicas of the event stream. For example, the set of example replicas of the event stream 200 may include multiple failover replicas of the event stream. Each of the primary replica of the event stream 202 and the failover replica of the event stream 214 may include a plurality of events. Each replica of the event stream may further include a binary log of events. Each event of the plurality of events may be located within a corresponding location (e.g., a location of the binary log) of the replica of the event stream. Further, each event may correspond to an absolute location (e.g., a location of the binary log as identified by a bin location, a bin position, a bin identifier, etc.) of the replica of the event stream and a relative location (e.g., a location relative to sequential event data one or more other events) of the event stream. For example, a first event in the primary replica of the event stream 202 may have an absolute location within the binary log and a relative location between event 2 and event 3. Each event of the set of example replicas of the event stream 200 may include an event title. Further, the number of events within a given replica of the event stream may depend on the sequential data read into the event stream.

In the example of FIG. 2, the primary event stream 202 includes a plurality of events. Further, the primary event stream 202 includes Event 99 from the sequential data stored as a first event 201 in bin position 99, Event 0 from the sequential data stored as a second event 203 in bin position 100, Event 1 from the sequential data stored as a third event 204 in bin position 101, Event 2 from the sequential data stored as a fourth event 206 in bin position 102, a flip task 208 stored in bin position 103 between Event 2 and Event 3, Event 3 from the sequential data stored as a fifth event 210 in bin position 104, and Event 4 from the sequential data stored as a sixth event 212 in bin position 105. Further, the failover replica of the event stream 214 includes Event 99 from the sequential data stored as a first event 213 in bin position 251, Event 0 from the sequential data stored as a second event 215 in bin position 252, Event 1 from the sequential data stored as a third event 216 in bin position 253, Event 2 from the sequential data stored as a fourth event 218 in bin position 254, the flip task 208 stored in bin position 255 between Event 2 and Event 3, Event 3 from the sequential data stored as a fifth event 222 in bin position 255, and Event 4 from the sequential data stored as a sixth event 224 in bin position 257. It will be understood that each of the primary replica of the event stream 202 and/or the failover replica of the event stream 214 may include more, less, or different events.

The flip task 208 may be inserted (e.g., by the data management system) into a primary database and replicated to the primary replica of the event stream 202 and the failover replica of the event stream 214 based on identifying a failover event associated with primary host of the primary replica of the event stream. The flip task 208 may identify an absolute position (e.g., bin position 103 in the primary replica and bin position 255 in the failover replica) and a relative position (e.g., between Event 2 and Event 3). The flip task 208 may also be inserted in the same relative location in the failover replica of the event stream 214 and may identify that nodes should begin reading data at bin position 255 of the failover replica of the event stream 214. Based on reading the flip task 208, a node may failover from the relative position within the primary replica of the event stream 202 to the same relative position within the failover replica of the event stream 214. For example, the relative position of the flip task 208 is between Event 2 and Event 3 and the node may failover to a different bin position 255 but the same relative position between Event 2 and Event 3 of the failover replica of the event stream. Therefore, nodes reading data from the primary replica of the event stream 202 may failover at a certain point of the primary replica of the event stream 202 based on the location of the flip task 208. Further, the nodes may failover at the same point of the failover replica of the event stream 214 as identified by the relative location of the flip task 208. Further, the nodes may failover from the primary replica of the event stream 202 and the failover replica of the event stream 214 based on each of the primary replica of the event stream 202 and the failover replica of the event stream 214 including a flip task in the same relative location (e.g., between Event 2 and Event 3). For example, a node may encounter the flip task 208 after reading event 2 and prior to reading event 3 from the primary replica of the event stream 202 and failover to bin position 255 of the failover replica of the event stream 214. Further, based on failing over to the failover replica of the event stream 214, the node can read event 3 from the failover replica of the event stream 214.

Figure 3:
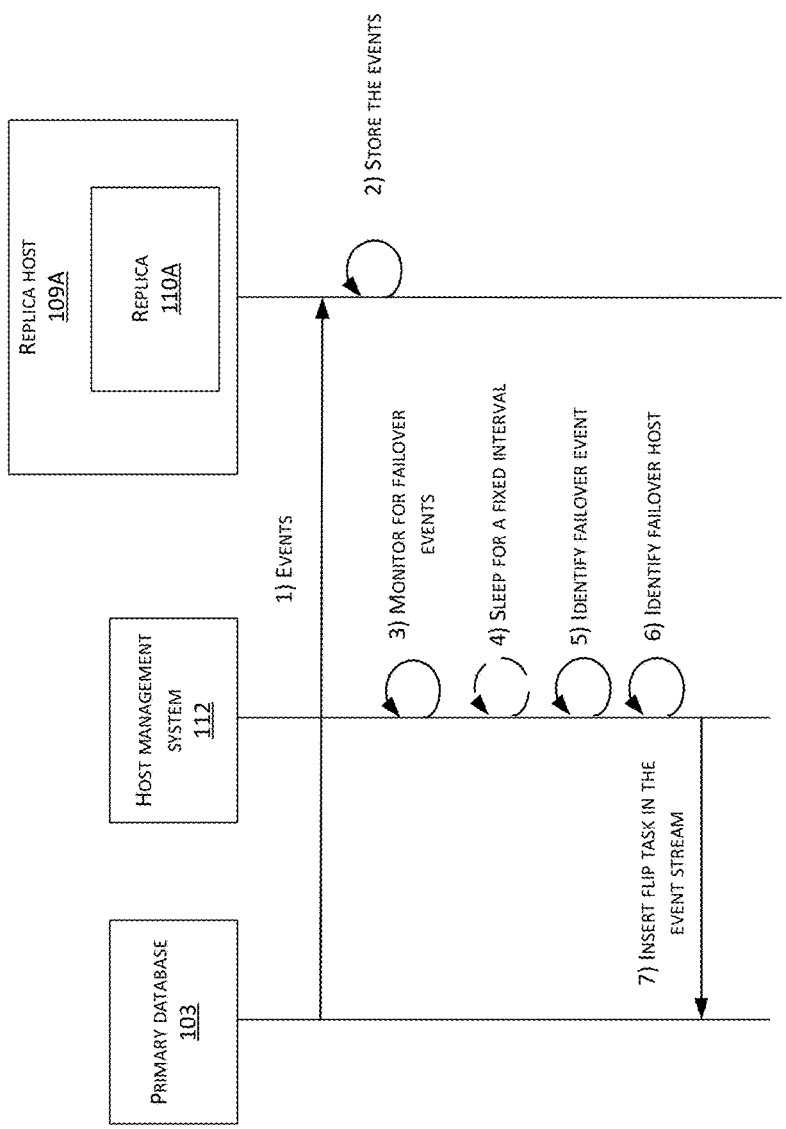
FIG. 3 depicts a schematic diagram showing the insertion of a flip task in a primary database in an example networked environment according to some embodiments.

FIG. 3 depicts interactions among various components shown in FIG. 1 for identifying a failover event and inserting a flip task into a primary database of the sequential data (e.g., the control plane data) in accordance with aspects of the present disclosure. The networked environment 300 may include various components implemented in a networked configuration as identified in FIG. 1. The networked environment 300 may include a primary database 103, a host management system 112, a replica host 109A, and a replica 110A. It will be understood that the networked environment 300 may include more, less, or different components.

As shown in FIG. 3 at [1], the replica host 109A can obtain events from the primary database 103. For example, the replica host 109A may stream in the events from the primary database 103. The events may be generated by the first computing device and stored in the primary database 103 based on users creating and/or modifying resources (e.g., mutating control plane data). For example, the events may identify a modification (e.g., a mutation, a task) for IAM resources. The replica host 109A may obtain the events periodically or aperiodically.

At [2], the replica host 109A can store the events in the replica 110A of the event stream of the primary database. For example, the replica host 109A may store a replica (e.g., a replica dataset of the data obtained from the primary database 103) and the replica host 109A can update the replica 110A of the event stream as data is streamed. Further, the replica host 109A can store the events in sequential order in the replica 110A. For example, the replica host 109A may store the events in the replica 110A based on the order of the events obtained from the primary database 103. Further, the replica host 109A may receive Event A, Event B, Event C, and Event D sequentially from the primary database 103 and the replica host 109A may store the events in the same sequential order (e.g., Event A, Event B, Event C, Event D) within the replica 110A. Each replica host 109A storing events from the primary database 103 in a corresponding replica may utilize the same sequential order (e.g., the events may have the same relative positions). For example, each replica may store events with the same sequential order (e.g., Event A, Event B, Event C, Event D). Each replica may further correspond to different absolute positions. For example, Event A may be stored in different absolute positions of each binary log. By retaining the relative position of the event, the flip task is able to cause a node to failover into the same relative position within a different replica.

At [3], the host management system 112 can monitor for failover events. For example, the host management system 112 may monitor the replica host 109A, the replica 110A, or any other component for failover events. The propagation system may connect to the replica host 109A via a canonical name ("CNAME") record which identifies the replica host 109A by mapping an alias to the replica host 109A. The host management system can monitor for a failover event related to the CNAME record (e.g., a change updating the host associated with the CNAME record). For example, the failover event may include an update of the CNAME record by remapping the alias from the replica host 109A to a replica host 109B. In some embodiments, the host management system 112 may monitor the replica host 109A based on determining that the host is a primary host for at least one node. Further, the replica host 109A and/or a node may identify, to the host management system 112, that the host is a primary host. In some embodiments, the host management system 112 may monitor all hosts instantiated for a particular system (e.g., the primary hosts, the failover hosts, unassigned hosts, and/or any other assigned hosts). The host management system 112 may monitor the replica host 109A to identify a failover event by identifying whether a particular failover event has occurred, is scheduled to occur, has been requested to occur, or may occur for the replica host 109A. For example, the failover event may include a request to implement a security patch or any other maintenance event associated with the replica host 109A. The failover event may include any event that may require downtime for the replica host 109A. For example, the failover event may include any event that requires the replica host 109A to be unavailable for a period of time.

At [4], the host management system 112 can sleep for a fixed interval. The host management system 112 may sleep for a fixed time interval based on determining that a failover event has not occurred. The host management system 112 may sleep for a fixed time interval and then monitor the replica host 109A for failover events. The host management system 112 may implement the sleep process any number of times. In some embodiments, the host management system 112 may not sleep for a fixed time interval and may continuously monitor the replica host 109A for failover events. Based on identifying a failover event, the host management system 112 may sleep for a fixed interval. In some embodiments, the host management system 112 may sleep for different time intervals based on identifying the failover event and not identifying a failover event (e.g., a longer time interval after identifying the failover event).

At [5], the host management system 112 can identify the failover event. The host management system 112 may identify the failover event and determine that the failover event is associated with the replica host 109A and/or the replica 110A. For example, the host management system 112 can determine that the CNAME record associated with the replica host 109A has been updated to a different host (e.g., replica host 109B) based on monitoring the CNAME record. The update of the CNAME record may be an automatic or manual update to the CNAME record. Further, the host management system 112 may identify additional failover events. For example, the host management system 112 may determine that a user has provided a security patch for the replica host 109A which requires a period of unavailability while the security patch is uploaded to the replica host 109A. Further, the host management system 112 may communicate with one or more additional systems (e.g., the system implementing the security patch) to delay the implementation of the security patch until each node for which the host is a primary host have failed over to a failover host. For example, the host management system 112 may insert a flip task into the event stream and may delay (e.g., cause the delay of) the failover event (e.g., the security patch) until each node has failed over the failover host.

At [6], the host management system 112 can identify the failover host. For example, the host management system 112 may identify a failover host associated with the replica host 109A. In some embodiments, the host management system 112 may be provided with or otherwise obtain a designation of the failover host. For example, a user, the first computing device, and/or the replica host 109A may provide an indication of the failover host to the host management system

112. Further, the host management system 112 may obtain an indication of the primary host and the failover host for each node. In some embodiments, the host management system 112 may identify the failover host based on the primary host. For example, each primary host may be associated with one or more primary hosts. In other embodiments, the host management system 112 may select or otherwise determine a failover host based on the first computing device, the replica host 109A, the replica 110A, the node, etc. Based on identifying the failover event and/or the failover host, host management system 112 (or another system) may update a CNAME record identifying the primary host and the primary replica. Based on identifying the failover host, the CNAME record may be updated to identify or point to the failover host and/or the failover replica.

At [7], the host management system 112 can insert the flip task in the primary database 103. The host management system 112 may insert the flip task in the primary database 103 based on identifying the failover event. For example, the host management system 112 may insert (e.g., automatically insert) the flip task in the primary database 103 based on identifying an update or change to the CNAME record. For example, the host management system 112 may monitor the CNAME record for changes and automatically insert the flip task into the primary database 103 based on identifying that the CNAME record has been updated from replica host 109A and/or replica 110A to replica host 109B and/or replica 110B. In some embodiments, a separate system (e.g., a CNAME monitoring system) may monitor the CNAME record and insert the flip task based on identifying a change or update to the CNAME record. The host management system 112 may insert the flip task in an absolute location and relative location of the primary database 103. The host management system 112 may identify the absolute location for placement of the flip task based on the events of the replica 110A of the event stream read by the node. For example, the host management system 112 may determine that the node has not read a plurality of events of the replica 110A of the event stream and based on this determination, the host management system 112 may insert the flip task into the plurality of events in the primary database 103. Further, the placement of the flip task may be based on the events of the replica of the event stream read by a plurality of nodes (e.g., the plurality of nodes for which the host 109A is a primary host). In some embodiments, the replica 110A of the event stream may not include events that have been read by the node and the host management system 112 may insert the flip task in any absolute position of the primary database 103. The host management system 112 may further insert the flip task in a particular relative position of the primary database 103. The relative position of the flip task may be based on one or more events of the event stream. For example, the relative position of the flip task may identify an event streaming prior to (e.g., immediately prior to) the flip task in the primary database 103 (e.g., Event A), an event streaming after (e.g., immediately after) the flip task in the primary database 103 (e.g., Event B), and/or events surrounding the flip task in the primary database 103 (e.g., Event A and Event B). In some embodiments, the flip task may identify (or the node may use the flip task to identify) the absolute position of the flip task, the relative position of the flip task, and/or the failover host.

Figure 4:
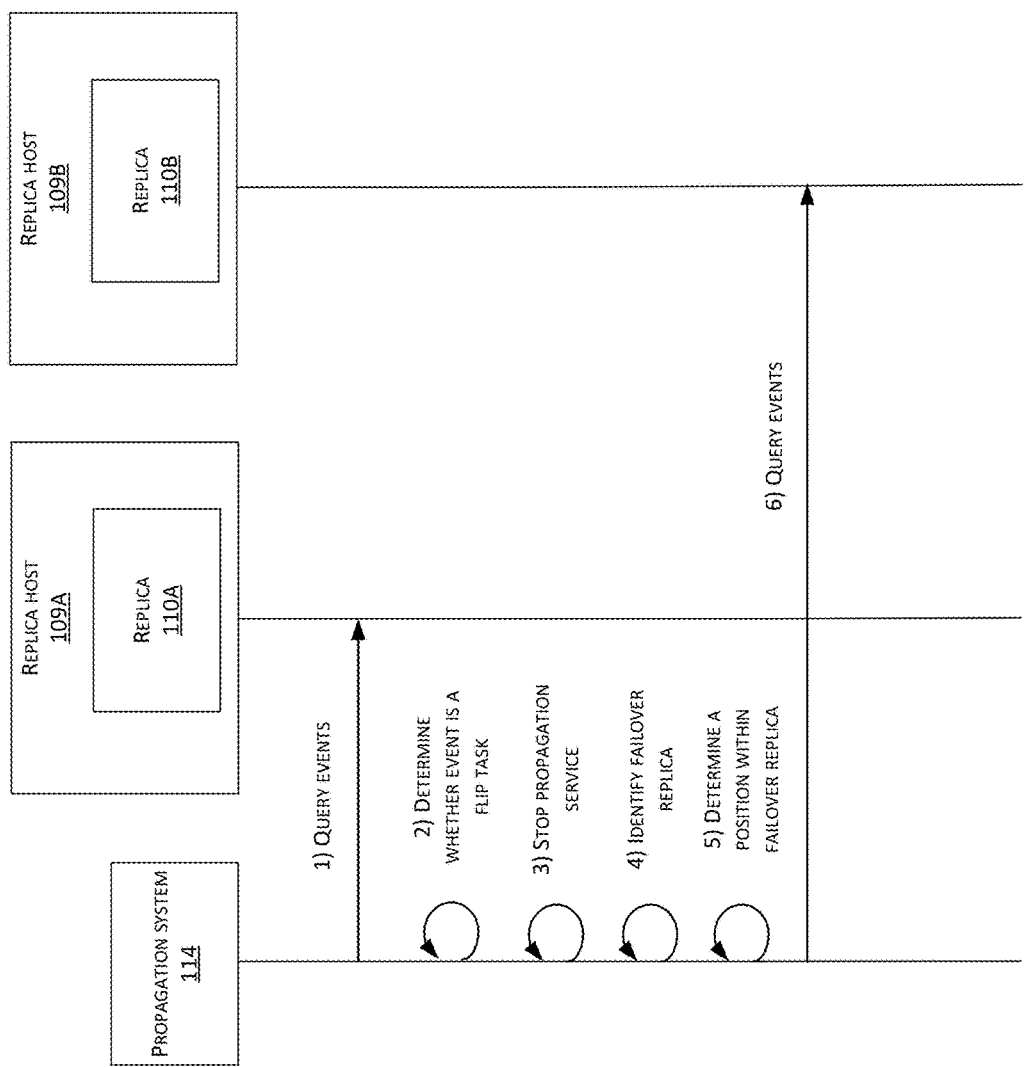
FIG. 4 depicts a schematic diagram showing a failover to a failover host in an example networked environment according to some embodiments.

FIG. 4 depicts interactions among various components shown in FIG. 1 for initiating a failover between replicas (e.g., replicas hosted or stored by hosts) based on encountering a flip task in a primary database of the sequential data in accordance with aspects of the present disclosure. The networked environment 400 may include various components implemented in a networked configuration as identified in FIG. 1. The networked environment 400 may include a propagation system 114, a replica 110A of sequential data stored by a first replica host 109A, and a replica 110B of the sequential data stored by a second replica host 109B. It will be understood that the networked environment 400 may include more, less, or different components.

As shown in FIG. 4 at [1], the propagation system 114 can query events stored in a replica 110A of the event stream by the first replica host 109A. The propagation system 114 can include one or more nodes (e.g., propagators). Each node may read the events from the replica 110A of the event stream for propagation to a receiving computing system. The propagation system 114 may be a propagation layer between a generating computing system (e.g., a computing system that originates the events, tasks, etc.) and a receiving computing system (e.g., a computing system that receives the events, tasks, etc.). Further, the one or more nodes can periodically or aperiodically read the events from the replica 110A of the event stream. For example, the one or more nodes may read the events from the replica 110A of the event stream as the events are stored (e.g., placed, inserted, etc.) in the replica 110A of the event stream from the primary database of the generating computing system. In processing the events, each of the one or more nodes may obtain the events from the replica 110A of the event stream, perform one or more data transformations to transform the events, and propagate the transformed events to a receiving computing system. In some embodiments, the one or more nodes may not transform the obtained events. The one or more nodes may use an identifier to connect to the host storing the replica 110A. For example, the one or more nodes may use a CNAME record that directs the one or more nodes to the host storing the replica 110A. Further, the CNAME record may map a name or identifier to the host. The one or more nodes may connect to the CNAME record to identify the primary replica.

At [2], the propagation system 114 (via the one or more nodes) may determine whether an event is (or corresponds to a flip task). The propagation system 114 may read each event of the replica 110A of the event stream and, as the events are read in, determine whether a particular event is or corresponds to a flip task. The propagation system 114 may determine that a particular event is not associated with a flip task and perform one or more data transformations on the event and propagate the transformed event. The propagation system 114 may continuously read and process events and determine whether each event is a flip task. Further, during the processing of the events, the propagation system 114 may identify an event as a flip task. The propagation system 114 may identify the flip task based on the syntax of the flip task. In some embodiments, the flip task may have a different syntax, format, and/or information as compared to the events of the replica of the event stream. In other embodiments, the flip task may include computing instructions that cause the propagation system 114 to identify the flip task. For example, the flip task may include a task to failover and, based on this task, the propagation system may identify the flip task.

At [3], the propagation system 114 can stop the propagation service and/or processing for the events of the replica 110A of the event stream. For example, the propagation system 114 can stop the propagation service based on determining that an event of the replica 110A of the event stream is a flip task. Each node of the propagation system 114 may individually read the flip task from the replica 110A of the event stream, identify the flip task, and determine to stop propagating events from the replica 110A of the event stream. As the flip task is placed within the replica 110A of the event stream read by each of the nodes, each of the nodes of the propagation system 114 may stop propagating events at the same logical position. For example, the replica 110A of the event stream may include "Event A, Event B, Flip Task, Event C," and each node may read Event A and process Event A, read Event B and process Event B, read the flip task and identify the flip task, and stop the propagation service. Further, each node may stop the propagation service prior to reading and processing Event C based on the placement of the flip task prior to Event C. Therefore, the propagation system 114 can ensure each node fails over at the same logical position within the replica 110A of the event stream.

At [4], the propagation system 114 can identify the failover replica 110B for failover of the nodes of the propagation system 114. The propagation system 114 may be updated (e.g., by a user or by a system) from the replica 110A to the replica 110B in order to identify the replica 110B as the primary replica. Further, the propagation system 114 may identify the replica 110B from the updated CNAME record. For example, the propagation system 114 may reset the connection of the nodes of the propagation system 114 to the CNAME record in order to identify the failover replica 110B. In some embodiments, the propagation system 114 may reset the connection based on determining a particular event is a flip task. In response to the reset of the connection, each node may obtain and/or identify the failover replica 110B.

At [5], the propagation system 114 may determine a position within the replica 110B to begin processing events. For example, the propagation system 114 may identify a relative position within the replica 110B based on the relative position of the flip task within the replica 110B. In some embodiments, the propagation system 114 can utilize metadata stored by each node to identify the position for failover within the replica 110B.

At [6], the propagation system 114 may query events stored in a replica 110B of the event stream by the replica host 109B. In order to process the events stored in the replica 110B of the event stream, each node of the propagation system 114 may update internal metadata to point to the replica 110B based on identifying the failover replica. Further, each node may update internal metadata to point to the identified position within the replica 110B. Each node may process the events stored in the replica 110B of the event stream based on the internal metadata. For example, the internal metadata may identify the replica 110B as the primary replica (e.g., via a field-value pair). Further, the internal metadata of each node may identify the relative position of failover from the replica 110A as identified by the propagation system 114 (e.g., as identified by the location of the flip task in the replica 110B). For example, the internal metadata of each node may identify that failover occurred after Event 102 of the replica of the event stream of replica 110A. The propagation system 114 may identify an absolute position (e.g., a position within the binary log) in the replica 110B corresponding to the flip task with a relative position matching the relative position of failover in replica 110A. The absolute position in the replica 110B may be different than the absolute position of failover in replica 110A. In some embodiments, the absolute position in the replica 110B may be the same position as the absolute position of failover in replica 110A. Based on the internal metadata, each node can process events from the replica 110B of the event stream at the relative position of failover in the replica 110A of the event stream (e.g., after Event 102). It will be understood that each node can failover from a first absolute position in replica 110A to a second, different absolute position in replica 110B. Therefore, by inserting the flip task in the primary database that is then replicated across each replica (at the same relative position but different absolute positions), the propagation system 114 can ensure that each node fails over at the same logical position (e.g., relative position).

Figure 5:
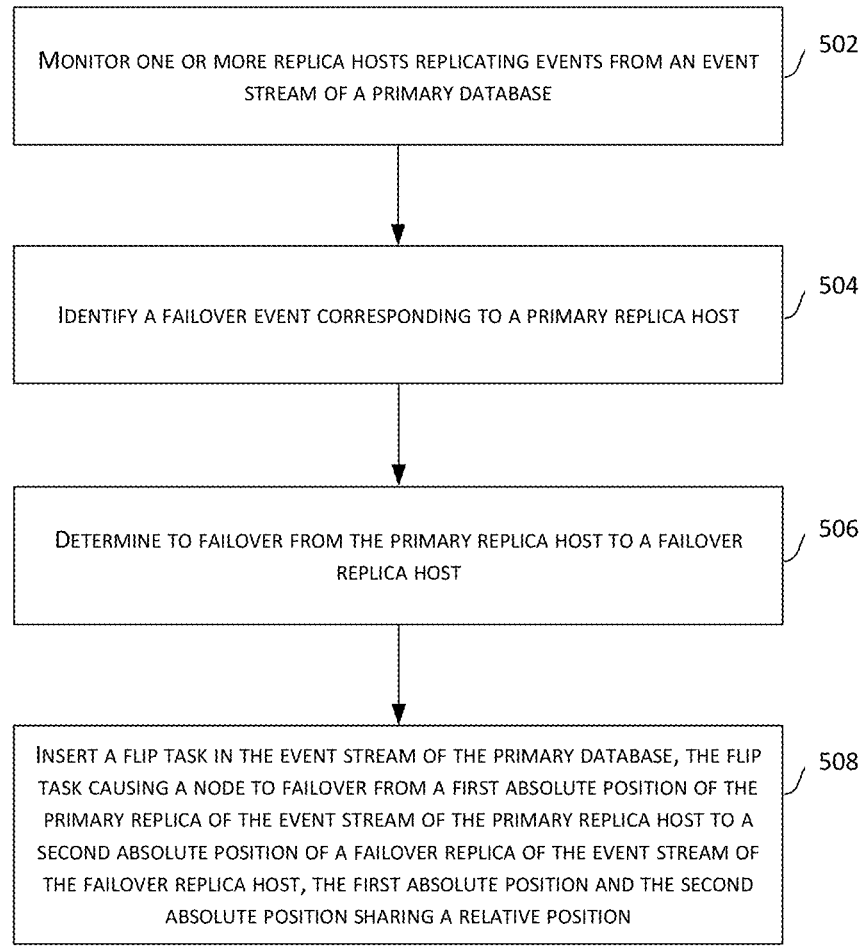
FIG. 5 is a flowchart of an example routine for inserting a flip task into an event stream to initiate failover between replicas.

FIG. 5 describes an illustrative process 500 for initiating a failover process for nodes of a propagation system. The process 500 includes monitoring one or more replica hosts and/or data replicas. Further, the process 500 includes identifying a failover event, determining to transition to a failover replica host, and inserting a flip task in a primary database to initiate the failover. By using a host management system to identify the failover and insert the flip task into the primary database, a comprehensive and uniform approach can be provided for initiating a failover.

The process 500 begins at block 502. The process 500 may begin automatically upon initiation of a propagation layer or system. For example, a propagation system may be initialized in order to propagate data between computing devices and the host management system may be initialized to monitor the propagation process and the nodes implementing said process. Further, an IAM system may be instantiated that includes the propagation system. The process 500 may be embodied in a set of executable program instructions stored on a computer-readable medium, such as one or more disk drives, of a computing system of a node or a server. When the process 500 is initiated, the executable program instructions can be loaded into memory, such as RAM, and executed by one or more processors of a computing system. Upon initiation of the process, at block 502, a computing system executing the process 500 (e.g., the host management system) monitors one or more replica hosts. The one or more replica hosts may be replicating events from an event stream (e.g., a stream of sequential data) of a primary database (e.g., the one or more replica hosts may correspond to (e.g., host, store, etc.) one or more replicas of sequential data). The one or more replica hosts may include a primary host corresponding to a primary replica of the sequential data and one or more failover replica hosts (e.g., secondary replica hosts) corresponding to one or more failover replicas (e.g., secondary replicas) of the sequential data. Further, the primary replica host may maintain a primary replica of the event stream streaming the sequential data (e.g., events, IAM events) and corresponding to the primary replica and each failover replica host may maintain a failover replica of the event stream streaming the sequential data and corresponding to a respective failover replica. The primary replica of the event stream and the failover replicas of the event stream may be replicas of an ordered event stream. It will be understood that the one or more replica hosts may include any number of failover replica hosts and/or primary replica hosts. Each replica host may read the sequential data from a computing device or system (e.g., an IAM system) and propagate the sequential data to one or more nodes (e.g., a propagation system that includes the nodes). In some embodiments, each replica host may be located in and/or associated with an opt-in region. Each replica host may include a binary log (e.g., a replica of a master binary log) and positions within each binary log may be identified by bin identifiers and/or bin positions (e.g., the primary replica host may include a first binary log with a first set of bin identifiers and a failover replica host may include a second binary log with a second set of bin identifiers). A first position within a binary log of the primary replica host may match (e.g., correspond to) a second position within a binary log of the failover replica host (e.g., the first position and the second position correspond to the same absolute position). Further, the same absolute positions within each binary log may identify separate and/or distinct relative positions within respective replicas of the event stream.

The propagation system may further include one or more nodes that can read the sequential data from the one or more replica hosts. Further, each node may read the sequential data from the designated primary replica of the event stream of the primary replica of the designated primary replica host. For example, each replica may identify a binary log and the one or more nodes can read the sequential data from a binary log of the primary replica host. Each node may also transform the sequential data based on one or more transformation operations to generate transformed sequential data and propagate the transformed sequential data to another computing system.

At block 504, the computing system identifies a failover event (e.g., a transition event) corresponding to the primary replica host. The failover event may include a maintenance event for the primary replica host (e.g., a user may request the performance of a particular maintenance event). For example, the failover event may include a security patch, a schema change, or any other maintenance activity.

At block 506, the computing system determines to failover (e.g., transition) from the primary replica host to a failover replica host. The computing system may identify the failover replica host based upon availability of the one or more failover replica hosts.

At block 508, the computing system inserts a flip task in the event stream of the primary database. The computing system may insert the flip task at a first position of the primary database. In some embodiments, the computing system may automatically insert the flip task based at least in part on identifying the failover event. The one or more replica hosts may replicate the flip task to the one or more replicas. The flip task may cause a node of the one or more nodes to failover from a first absolute position of the primary replica of the event stream of the primary replica host to a second absolute position of a failover replica of the event stream of the failover replica host. Each node reading from the primary replica of the event stream may initiate the failover at the same relative position. The relative position may identify one or more of a first event and a second event of the primary replica of the event stream, the flip task located between first event and the second event in the primary replica of the event stream. The first absolute position and the second absolute position may be different absolute positions (e.g., the first position and the second position may be associated with different positions within binary logs as identified by different bin identifiers, different bin locations, etc.). In order to initiate the failover, the node may read the flip task at the first absolute position of the primary replica of the event stream. The node may connect to the failover replica host based on reading the flip task from the primary replica of the event stream. Further, the node may determine the failover replica host is an updated primary replica host based on reading the flip task (e.g., the failover replica host has been updated to primary host status). Based on connecting to the failover replica host, the node may read the sequential data at the second position of the failover replica of the event stream (e.g., at the same relative position as the failover). For example, the node may identify the flip task in the failover replica of the event stream and begin reading the sequential data at this position. Further, each node may failover at the first position (e.g., a first location of the binary log of the primary replica host).

Figure 6:
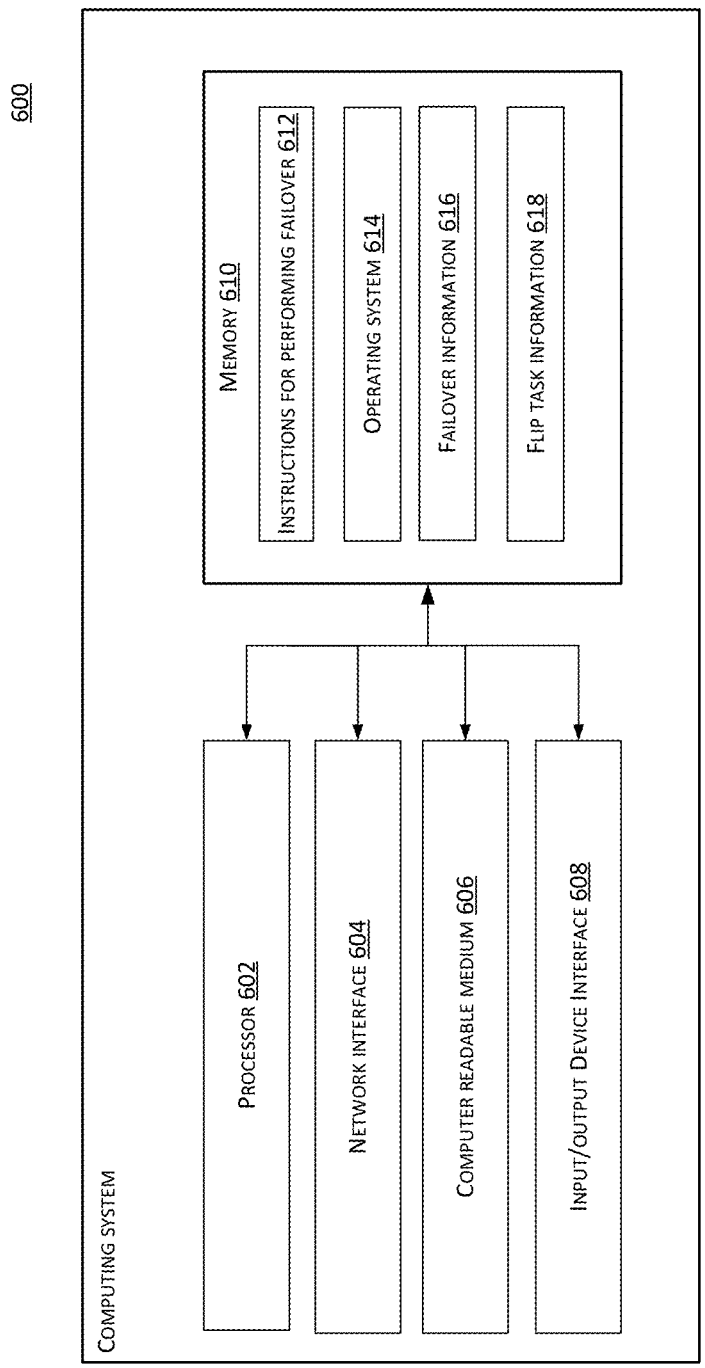
FIG. 6 shows an example computing device that may be used to implement aspects of the present disclosure.

FIG. 6 illustrates an example computing system 600 configured to execute the processes and implement the features described above. In some embodiments, the computing system 600 may include: one or more computer processors 602, such as physical central processing units ("CPUs"); one or more network interfaces 604, such as a network interface cards ("NICs"); one or more computer readable medium drives 606, such as a high density disk ("HDDs"), solid state drives ("SSDs"), flash drives, and/or other persistent non-transitory computer-readable media; an input/output device interface 608, such as an input/output ("IO") interface in communication with one or more microphones; and one or more computer readable memories 610, such as random access memory ("RAM") and/or other volatile non-transitory computer-readable media.

The network interface 604 can provide connectivity to one or more networks or computing systems. The computer processor 602 can receive information and instructions from other computing systems or services via the network interface 604. The network interface 604 can also store data directly to the computer-readable memory 610. The computer processor 602 can communicate to and from the computer-readable memory 610, execute instructions and process data in the computer readable memory 610, etc.

The computer readable memory 610 may include computer program instructions that the computer processor 602 executes in order to implement one or more embodiments. The computer readable memory 610 can store instructions for performing the failover 612 (e.g., instructions for performing the process 500 of FIG. 5). The computer readable memory 610 can store an operating system 614 that provides computer program instructions for use by the computer processor 602 in the general administration and operation of the computing system 600. The computer readable memory 610 can further include computer program instructions and other information for implementing aspects of the present disclosure. For example, in one embodiment, the computer readable memory 610 may include failover information 616. As another example, the computer-readable memory 610 may include flip task information 618. In some embodiments, multiple computing systems 600 may communicate with each other via respective network interfaces 604, and can implement multiple sessions each session with a corresponding connection parameter (e.g., each computing system 600 may execute one or more separate instances of the processes 500), in parallel (e.g., each computing system 600 may execute a portion of a single instance of a process 500), etc.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, read-only memory ("ROM"), erasable programmable read-only memory ("EPROM"), electronically erasable programmable read-only memory ("EEPROM"), registers, hard disk, a removable disk, a compact disc read-only memory ("CD-ROM"), or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A computer-implemented method comprising:
   obtaining, by a primary replica host comprising one or more computer processors, an event stream of sequential data from a database;
   storing, by the primary replica host, a primary replica of the event stream of the sequential data as a primary binary log file of events;
   reading, by a propagator node comprising one or more computer processors, a first portion of sequential data from the primary replica host;
   monitoring, by a host management system comprising one or more computer processors, network mapping data associated with the primary replica host;
   identifying, by the host management system, a modification to the network mapping data associated with the primary replica host;
   determining, by the host management system, to failover from the primary replica host to a failover replica host based on identifying the modification to the network mapping data, wherein the failover replica host is configured to obtain the event stream of the sequential data from the database and store a failover replica of the event stream of the sequential data as a failover binary log file of events;

inserting, by the host management system, a flip task in the event stream of the sequential data, wherein the primary replica host obtains the flip task and stores the flip task at a relative position of the primary binary log file of events between the first portion of the sequential data and a second portion of the sequential data, and wherein the second portion of the sequential data is at a first absolute position of the primary binary log file of events;

connecting, by the propagator node, to the failover replica host based on reading the flip task at the relative position of the primary binary log file of events; and reading, by the propagator node, the second portion of the sequential data at a second absolute position of the failover binary log file of events, wherein the second absolute position is different than the first absolute position, and wherein the failover binary log file of events comprises the flip task at a same relative position as the relative position of the primary binary log file of events.

2. The computer-implemented method of claim 1, wherein monitoring the network mapping data comprises:
   determining a host name associated with a canonical name record;
   validating the host name associated with the canonical name record;
   sleeping for a fixed time interval; and
   revalidating the host name associated with the canonical name record.

3. The computer-implemented method of claim 1, wherein monitoring the network mapping data comprises:
   validating a canonical name record, wherein the canonical name record is associated with a first identifier corresponding to the primary replica host during a first time period; and
   determining, at a second time period after the first time period, the canonical name record is associated with a second identifier corresponding to the failover replica host;
   wherein identifying the modification to the network mapping data associated with the primary replica host is based at least in part on determining the canonical name record is associated with the second identifier corresponding to the failover replica host.

4. The computer-implemented method of claim 1, wherein inserting the flip task comprises automatically inserting the flip task based on determining to failover from the primary replica host to the failover replica host.

5. A system comprising:
   a database of sequential data;
   a primary replica host maintaining a primary replica of the database of the sequential data;
   a secondary replica host maintaining a secondary replica of the database of the sequential data;
   a node configured to read a first portion of the sequential data from the primary replica host; and
   a host management system comprising computer-readable memory and one or more processors configured to:
      identify a failover event corresponding to the primary replica host;
      determine to failover from the primary replica host to the secondary replica host based on identifying the failover event; and
      insert a flip task at a relative position of the database between the first portion of the sequential data and a second portion of the sequential data, wherein the second portion of the sequential data is at a first distinct position of the primary replica and at a second distinct position of the secondary replica, and wherein the second distinct position is different than the first distinct position;
   wherein the node is further configured to:
      read the flip task from the primary replica at the relative position;
      connect to the secondary replica host based on reading the flip task; and
      read the second portion of the sequential data at the second distinct position of the secondary replica, wherein the secondary replica comprises the flip task at a same relative position as the primary replica.

6. The system of claim 5, wherein the one or more processors are further configured to:
   monitor the primary replica host, wherein identifying the failover event corresponding to the primary replica host is based at least in part on monitoring the primary replica host.

7. The system of claim 5, wherein the one or more processors are further configured to:
   monitor a canonical name record associated with the primary replica host, wherein the canonical name record identifies the primary replica host,
   wherein to identify the failover event, the one or more processors are further configured to identify an update of the canonical name record from the primary replica host to the secondary replica host.

8. The system of claim 5, wherein the database of the sequential data comprises a binary log of the sequential data, wherein the primary replica host is configured to:
   obtain the binary log of the sequential data; and
   replicate the binary log of the sequential data to generate the primary replica of the database of the sequential data;
   wherein the secondary replica host is configured to:
      obtain the binary log of the sequential data; and
      replicate the binary log of the sequential data to generate the secondary replica of the database of the sequential data, wherein the primary replica of the database of the sequential data and the secondary replica of the database of the sequential data share a relative ordering of the sequential data, wherein the primary replica of the database of the sequential data and the secondary replica of the database of the sequential data each include a different absolute ordering of the sequential data.

9. The system of claim 5, wherein the primary replica of the database of the sequential data and the secondary replica of the database of the sequential data have different numbering sequences or schemes, wherein the first distinct position is based on a first numbering sequence of the primary replica of the database of the sequential data and the second distinct position is based on a second numbering sequence of the secondary replica of the database of the sequential data.

10. The system of claim 5, wherein the first distinct position and the second distinct position correspond to:
    different physical positions; or
    different identifiers.

11. The system of claim 5, wherein the database maintains the sequential data, wherein the sequential data comprises transformed sequential data, wherein each of the primary replica host and the secondary replica host are configured to obtain the sequential data from the database.

12. The system of claim 5, wherein the failover event comprises:
   a security patch;
   a schema change; or
   a maintenance activity.

13. The system of claim 5, further comprising a plurality of nodes, the plurality of nodes comprising the node, wherein the plurality of nodes are configured to read the first portion of the sequential data from the primary replica of the database of the sequential data.

14. The system of claim 5, wherein the node is further configured to:
   read the first portion of the sequential data from the primary replica of the database of the sequential data;
   transform the first portion of the sequential data based on one or more transformation operations to generate transformed sequential data; and
   propagate the transformed sequential data.

15. The system of claim 5, wherein the relative position identifies one or more of a first event and a second event of the primary replica of the database of the sequential data, the flip task located between the first event and the second event in the primary replica of the database of the sequential data.

16. The system of claim 5, wherein the database comprises a database of an identity access management system, wherein the primary replica host is configured to:
   read the sequential data from the database of the identity access management system;
   replicate the sequential data to generate the primary replica of the database of the sequential data; and
   provide the sequential data to a propagation system, wherein the propagation system comprises the node.

17. The system of claim 5, wherein the node is further configured to:
   determine the secondary replica host comprises an updated primary replica host based at least in part on reading the flip task; and
   update internal metadata identifying the secondary replica host comprises the updated primary replica host.

18. A host management system comprising computer-readable memory and one or more processors configured to:
   identify an event corresponding to a first replica host, the first replica host maintaining a first replica of an event stream of sequential data, wherein a second replica host maintains a second replica of the event stream of the sequential data, and wherein a node is configured to read a first portion of the sequential data from the first replica host;
   determine to transition from the first replica host to the second replica host based on identifying the event; and
   insert a flip task in the event stream, wherein the first replica host replicates the flip task at a first distinct position of the first replica of the event stream, wherein the first distinct position is at a relative position after the first portion of the sequential data, wherein the flip task causes the node to read the flip task at the first distinct position and failover from the first distinct position of the first replica to a second distinct position of the second replica, wherein the first distinct position is different from the second distinct position, and wherein the second distinct position is at the relative position after the first portion of the sequential data in the second replica.

19. The host management system of claim 18, wherein the event comprises:
   an update to a canonical name record associated with the first replica host;
   a security patch;
   a schema change; or
   a maintenance activity.

20. The host management system of claim 18, wherein the first replica host obtains a binary log of the sequential data and replicates the binary log of the sequential data to generate the first replica of the event stream of the sequential data, wherein the second replica host obtains the binary log of the sequential data and replicates the binary log of the sequential data to generate the second replica of the event stream of the sequential data.

* * * * *